United States Patent
Zhao et al.

(10) Patent No.: US 6,207,740 B1
(45) Date of Patent: Mar. 27, 2001

(54) POLYMERIC METHINE ULTRAVIOLET ABSORBERS

(75) Inventors: Xiaodong Edward Zhao; Todd D. Danielson, both of Moore, SC (US)

(73) Assignee: Milliken & Company, Spartanburg, SC (US)

( * ) Notice: Subject to any disclaimer, the term of this patent is extended or adjusted under 35 U.S.C. 154(b) by 0 days.

(21) Appl. No.: 09/361,875

(22) Filed: Jul. 27, 1999

(51) Int. Cl.[7] ........................................ C08K 5/06
(52) U.S. Cl. ........................ 524/366; 524/368; 524/367
(58) Field of Search ......................... 524/366, 368, 524/369

(56) References Cited

U.S. PATENT DOCUMENTS

| | | | |
|---|---|---|---|
| 3,157,633 | * 11/1964 | Kuhn | 260/200 |
| 3,546,270 | 12/1970 | Kirchmary et al. | 260/465 |
| 3,634,320 | 1/1972 | Metzner et al. | 260/45.8 R |
| 3,809,707 | 5/1974 | Havinga et al. | 260/404 |
| 3,880,992 | 4/1975 | Smolin et al. | 424/60 |
| 4,284,729 | * 8/1981 | Cross | 521/158 |
| 4,496,757 | 1/1985 | Dexter et al. | 560/82 |
| 4,619,990 | 10/1986 | Elmasry | 534/573 |
| 4,732,570 | * 3/1988 | Baumgartner et al. | 8/506 |
| 4,845,188 | 7/1989 | Waever et al. | 528/272 |
| 4,920,169 | 4/1990 | Avar | 524/219 |
| 5,075,491 | 12/1991 | Weaver et al. | 560/45 |
| 5,229,106 | 7/1993 | Sabatelli et al. | 424/59 |
| 5,442,086 | 8/1995 | Krutak et al. | 558/401 |
| 5,543,083 | 8/1996 | Sivik et al. | 252/403 |

FOREIGN PATENT DOCUMENTS

| | | |
|---|---|---|
| 2310135 | 3/1975 | (DE) . |
| 3409921 | 3/1984 | (DE) . |
| 0350386 | 7/1988 | (EP) . |

* cited by examiner

*Primary Examiner*—Edward J. Cain
(74) *Attorney, Agent, or Firm*—Terry T. Moyer; William S. Parks

(57) ABSTRACT

This invention relates to novel ultraviolet absorbing methine-based compounds comprising polyoxyalkylene moieties. Such compounds provide excellent, inexpensive, protection from ultraviolet exposure within various media, including, but not limited to, thermoplastics. The presence of polyoxyalkylene chains on the methine backbone permits such an introduction within thermoplastics while simultaneously providing very low degrees of migration from the target substrate. This invention also concerns methods of making the aforementioned ultraviolet absorbing thermoplastic compositions.

13 Claims, No Drawings

POLYMERIC METHINE ULTRAVIOLET ABSORBERS

FIELD OF THE INVENTION

This invention relates to novel ultraviolet absorbing methine-based compounds comprising polyoxyalkylene moieties. Such compounds provide excellent, inexpensive, protection from ultraviolet exposure within various media, including, but not limited to, thermoplastics. The presence of polyoxyalkylene chains on the methine backbone permits such an introduction within thermoplastics while simultaneously providing very low degrees of migration from the target substrate. This invention also concerns methods of making the aforementioned ultraviolet absorbing the thermoplastic compositions.

BACKGROUND OF THE PRIOR ART

All of the U.S. patents cited throughout this specification are hereby entirely incorporated herein.

Ultraviolet absorber compounds have been utilized for a number of protective applications, including within compositions for covering skin, on and within apparel and other types of textiles, within transparent plastic containers, and the like, to combat the harmful and degradable effects of certain wavelengths of light in the UV spectrum. The best known UV absorbers are benzotriazoles, available from Ciba-Geigy under the tradename Tinuvin®, and benzophenones, available from Cytec Industries under the trademark Cyasorb™. Such compounds are highly effective in their UV absorber capacity; however, they are quite costly, can prove difficult to incorporate within different target media, and tend to migrate from within certain types of media (such as plastics). Furthermore, these two well known types of UV absorbers present handling difficulties in that they are generally produced and utilized in powder form and have relatively low melting points. Particularly, within plastic media, the powder form of these compounds is problematic; a liquid is much easier to handle, does not require melting, and provides more effective and thorough mixing throughout the target plastic. Additionally, these previously utilized UV absorbers provide UV protection over a relatively narrow range of wavelengths ($\lambda_{max}$ from about 290 to about 340 nm for benzotriazoles; from 260 to 300 run for benzophenones), which ultimately leaves a potentially damaging range of unprotected UV exposure (to about 400 nm). Thus, there exists a need to provide a highly effective, liquid ultraviolet absorber which exhibits a versatility to be incorporated within or applied to different and various media and substrates and which, alternatively, can provide protection over the range of wavelengths in the UV spectrum of from about 290 to about 400 nm (in order to provide the best overall protection from possible harm and/or degradation associated with UV exposure).

Methine-based compounds, in particular certain malonate derivatives, as in European Patent Abstract 350-386-A, to L'Oreal SA, are useful as UV absorbers in cosmetic sunscreen compositions, are generally inexpensive to make, and provide UV protection in the spectrum from about 280 to about 360 nm. However, such compounds are highly soluble in organic solvents and would therefore easily migrate from solid compositions, such as plastics, upon introduction therein. Thus, although the utilization of an effective UV absorber, such as a malonate derivative, within plastics, may be highly desirable, such has never been taught nor fairly suggested within the prior UV absorber art due to the great difficulty in producing such a stable, and thus highly effective, UV absorbing composition from such a methine-based source. There exists a need then to produce an inexpensive UV absorber, preferably methine-based, which possesses the requisite ability to remain within media such as thermoplastics and the like (as noted above), and thus provide necessary and desirable protection from degradation due to UV exposure.

It has now been found that through the addition of polyoxyalkylene chains onto a methine-based ultraviolet absorber compound, greater versatility of potential uses for the new UV absorber is provided. Therefore, it has been found that such polyoxyalkylenated methine-based compounds provide a UV absorber which is highly effective in filtering harmful UV-A and UV-B rays over a broad spectrum ($\lambda_{max}$ from about 320 to about 400 nm, more preferably from about 350 to 390 nm). Furthermore, it has been found that in combination with a benzotriazole and/or a hydroxybenzophenone, or other similar type of UV absorber compound, the resultant composition is accorded protection from a great amount of potentially damaging UV radiation (from approximately 250 to about 400 nm). Additionally, such a combination is highly stable within the target media, and thus provides long-term protection to the desired sample stored within the treated plastic article.

Although some interest has been demonstrated within the area of methine-based UV absorber compounds (i.e., L'Oreal's malonate derivatives), to date there has been no disclosure or fair suggestion regarding the utilization of the polyoxyalkylenated derivatives of such UV absorbers in that capacity within certain media (such as, for example, plastics), or on other surfaces (skin, textiles, for example), or in other applications (inks, and the like, for example). In particular, no disclosures exist concerning methine-based polyalkylenated UV absorber compound which provide an effective protected range of wavelengths from UV exposure of from about 320 to about 400 nm. There is thus a great need within the Uv absorber market, and most particularly within the transparent plastic film and container markets (for storing and protecting food, pills, and the like) for such types of improvements associated with relatively inexpensive materials and processes provided by the inventive polyoxyalkylenated methine-based UV absorber compounds.

OBJECTS OF THE INVENTION

It is therefore an object of this invention to provide a novel polyoxyalkylenated methine-based ultraviolet absorbing compound. A further objective of this invention is to provide a polymeric UV absorber which can be used within various media and on different substrates as an effective UV filtering compound or within a suitable composition for protection against potentially harmful ultraviolet rays. It is yet another object of this invention to provide a polyoxyalkylenated methine-based ultraviolet absorber which simultaneously acts as a colorant for the target media or substrates. Still another object of this invention is to provide an effective UV absorbing composition or article which comprises the inventive polyoxyalkylenated methine-based UV absorber and other UV absorbing compounds to provide a wide range of ultraviolet protection.

SUMMARY OF THE INVENTION

The present invention thus encompasses a polyoxyalkyleneated methine-based ultraviolet absorber compound and compositions comprising such a novel compound. Such compositions include, but are not limited to plastics, solvent systems, inks, textile treatment compositions, skin protectant, skin tanning formulations, and the like.

The term plastics is intended to encompass both thermoplastics and thermosets, such as polyolefins, polyesters, polyamides, polyurethanes, polycarbonates, and the like, and can be in any standard form, such as in films, sheets, bottles, containers, vials, and the like. Ultraviolet absorbers are typically added to such compositions during the injection molding (or other type of molding, such as blow molding), thereof, including, and without limitation, by mixing the liquid absorber with resin pellets and melting the entire coated pellets, or through a masterbatch melting step while the resin and absorber are pre-mixed and incorporated together in pellet form. Such plastics include, again without limitation, polyolefins, polyesters, polyamides, polyurethanes, polycarbonates, and other well known resins, such as those disclosed within U.S. Pat. No. 4,640,690, to Baumgartner et al., and U.S. Pat. No. 4,507,407, to Kluger et al. under the terms "thermoplastics" and "thermosets." Generally, such plastics, including the UV absorber additive, are formed through any number of various extrusion, etc., techniques, such as those disclosed in the aforementioned U.S. patents.

The term "solvent systems" encompasses any aqueous or organic liquid formulations. Non-limiting examples of the intended aqueous systems include cleaning solutions, detergents, fabric softeners, marking inks and colorants, and keratin dyes. Non-limiting examples of organic formulations include the non-aqueous types of cleaning solutions, detergents, fabric softeners, marking inks and colorants, keratin dyes, as well as descalers, surfactant formulations, hydrocarbon compositions, and the like. The addition of inventive UV absorbers is accomplished through the mere addition of the liquid compound within the target solvent system with simultaneous and thorough mixing.

Printing inks include compositions utilized as colorants within, again, as merely examples, pens, including, but not limited to ball-point and fountain pens, dot-matrix printers, toners for standard copy machines, ink-jet applications, permanent markers, dry-erase markers, newsprint, magazine print, laser jet printers, and the like. The addition of inventive UV absorbers is accomplished through the mere addition of the liquid compound within the target printing ink formulations with simultaneous and thorough mixing.

The terms textile treatment compositions comprises both any formulations for application on textiles (and thus leaving at least a temporary UV absorbing coating, or the like, on the textile surface). Skin protectant and skin tanning formulations basically encompass any compositions comprising the novel UV abosorbing compound which is utilized to protect skin from solar radiation.

Accordingly, this invention includes a methine-based ultraviolet absorber compound wherein said compound comprises at least one polyoxyalkylene chain. More specifically, the inventive compound is represented by Formula (I)

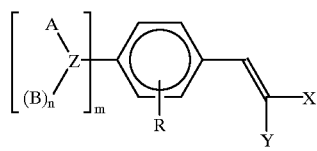

(I)

wherein R is selected from the group consisting of $C_{1-20}$ alky, halo, hydroxyl, hydrogen, cyano, sulfonyl, sulfo, sulfato, aryl, nitro, carboxyl, and $C_{1-20}$ alkoxy; X and Y are the same or different and are selected from the group consisting of C(O)OR, C(O)R, $C_{1-20}$alkyl, and $C_{1-20}$ alkoxy, and R is defined as above; Z is a linking group selected from the group consisting of N, O, and S; m is 1, 2, or 3; A is represented by the Formula (II)

[Alkyleneoxy constituent]$_z$R'  (II)

wherein Alkyleneoxy constituent is selected from the group consisting of $C_{2-20}$ alkyleneoxy, R' is selected from the group consisting of hydrogen, $C_{1-20}$ alkoxy, $C_{1-20}$ alkyl, and $C_{1-20}$ esters; B is selected from the group consisting of hydrogen, lower alkyl, and A; and n is either 0 or 1, wherein n is 1 if Z is N, and n is 0 if Z is either O or S. This invention also encompasses compositions of the inventive methine-based UV absorber and (a) plastics, (b) printing inks, or (c) solvent systems, as well as textiles comprising fabrics (1) coated with or impregnated with the inventive methine-based UV absorber or (2) comprising individual fibers into which the inventive UV absorber has been diffused.

Preferably, the R group for Formula (I) above is hydrogen, hydroxyl, or $C_{1-10}$ alkyl; most preferably R is hydrogen or hydroxyl. Preferably, X and Y are C(O)OR, where R is $C_{1-10}$ alkyl. Preferably, Alkylene constituent is either oxyethylene, oxypropylene, or oxybutylene, with oxyethylene and oxypropylene most preferred; R' is preferably hydrogen; and Z is preferably from 2 to 80, more preferably from 3 to 50, and most preferably from about 5 to about 20.

The proper amount utilized in the various compositions and applications is highly dependent on each of those separate possibilities. Thus, in plastics, for example, the inventive UV absorber is added in an amount of from about 0.001 to about 1.5% by weight of the total plastic composition, preferably from about 0.01 to about 1.0%, and most preferably from about 0.1 to about 0.5%.

DESCRIPTION OF THE PREFERRED EMBODIMENTS

The general methods of making and utilizing the preferred inventive UV absorbers are as follows:

UV Absorber Production

The general method of forming the inventive UV absorbing compounds basically entails the reaction of polyalkylenated aniline or resorcinol or similar compound with a malonate, ester, or other similar from carboxyl-group containing compound. The specifically preferred methods (and the preferred compounds as well) are thus provided below:

EXAMPLE 1

One thousand parts of p-formyl-N,N-polyoxyethyleneaniline (7 moles EO) were mixed with 124 parts of diethyl malonate and 30 parts of ammonium carbonate. The mixture was then heated between 70 and 75° C. for 10 hours. The reaction was monitored by the UV-Vis spectra of the mixture. When the reaction was completed, as indicated by the presence of an absorption maximum at 377 nm (A/gl=20.1), the product was then further stripped under reduced pressure to yield the final product.

EXAMPLE 2

One-hundred parts of p-formyl-N,N-polyoxyethylene-polyoxypropyleneaniline (7 moles EO and 15 moles PO) were mixed with 24 parts of diethyl malonate, 4.4 parts of morpholine, and 3.3 parts of acetic acid. The mixture was then heated to between 80 and 85° C. for 3 hours. The reaction was monitored by the UV-Vis spectra of the mixture. When the reaction was completed, as indicated by the presence of an absorption maximum at 377 nm (A/gl=22.0), the product was further stripped under reduced pressure to yield the final product.

EXAMPLE 3

Two hundred and fifty parts of p-formyl-N,N-polyoxyethylene-polyoxypropylenetoluidine (16 moles EO and 10 moles PO) were mixed with 43 parts of diethyl malonate, 7.9 parts of morpholine, and 5.7 parts of acetic acid. The mixture was then heated to between 80 and 85° C. for 3 hours. The reaction was monitored by the UV-Vis spectra of the mixture. When the reaction was completed, as indicated by the presence of an absorption maximum at 383.5 nm (A/gl=17.5), the product was further stripped under reduced pressure to yield the final product.

EXAMPLE 4

Five hundred and twenty parts of p-formyl-N,N-polyoxyethylene-polyoxypropyleneaniline (7 moles EO and 15 moles PO) were mixed with 78 parts of ethylacetoacetate, 24 parts of morpholine, and 70 parts of acetic acid. The mixture was then heated to between 80 and 85° C. for 3 hours. The reaction was monitored by the UV-Vis spectra of the mixture. When the reaction was completed, as indicated by the presence of an absorption maximum at 387.5 nm (A/gl=14.7), the product was further stripped under reduced pressure to yield the final product.

EXAMPLE 5

Five hundred and forty parts of 2,4-polyoxyalkylene-benzaldehyde (10 moles EO and 10 moles PO) were mixed with one hundred and five parts of diethyl malonate, twenty parts of morpholine, and fourteen parts of acetic acid. The mixture was heated to 95° C. The reaction was monitored by the UV-Vis spectra of the mixture. When the reaction was completed, the product was washed with hot water and then dehydrated to afford the final product exhibiting an absorption maximum at 358 n in (A/gl=12.5).

EXAMPLE 6

Five hundred parts of the product from EXAMPLE 3, above, were mixed with fifty-five parts of dodecyl succinic anhydride and one part of 1-methyl-imidazole. The mixture was heated at 90° C. for four hours under a nitrogen atmosphere. The mixture was further stripped at reduced pressure to afford the final product exhibiting an absorption maximum at 383 nm (A/gl=15.7).

Thermoplastic Composition Formation

The UV absorber was introduced within an injection molding operation for a polyolefin thermoplastic, for instance polypropylene. The liquid absorber was added by way of a positive displacement or transfer pump, either continuously or, preferably, intermittently into an injection molding machine (such as an Arburg Molder). At the same time, the polypropylene resin (in pellet form) was fed into the throat of the molding machine by way of a screw which works in concert with the transfer pump metering the liquid absorber. The rotating screw drew the resin pellets into the feed throat while the pump activated introduction of the liquid absorber into the same area of the machine (in this manner a consistent ratio of pellets to absorber was permitted). At that point, the mix of absorber and pellets was gravity fed into a mixing chamber within the molding machine. In the feed section, melting was accomplished through the utilization of a heated (heat transferred from the barrel of the machine) screw extruder which rotated. The rotating screw also effectuated thorough mixing of the absorber and the molten resin together producing a uniform plastic melt which was then injected into a mold in order to form the desired thermoplastic article.

Testing for absorption improvements and other important criteria was accomplished through the formation of plaques of treated polyolefin (and other types of) resins. These plaques were formed through the process outlined above with the specific compositions listed below in Table 1 for absorbers and resins.

TABLE 1

PET Plaques Produced for Further Testing

| Plaque # | UV Absorber (from Example #) | Resin |
| --- | --- | --- |
| A | 3 | Polyethylene Terephthalate |
| B | 2 | Polyethylene Terephthalate |

The plaques noted above were formed with amounts of UV absorber from 200 to 400 ppm and were 50 mils in thickness. Testing was then performed on the resultant plaques, as noted below.

Testing for UV Properties of the Plastic Compositions

Plaque A was tested for a number of criteria. First, the UV absorption spectrum was taken, including upon introduction of different amounts of the inventive absorber during plaque production. The plaque was exposed to a Xenon Arc lamp source (to simulate sunlight in a broad spectnim) for periods of 10, 20, and 40 hours and subsequently tested after each interval for any change in UV absorption. Measurements were also made prior to exposure to determine the change in lightfastness after the specific exposure intervals. The test results, in correlation to the times exposed and the amounts of UV absorber present are listed below.

Plaque A was tested for lightfastness at a loading of about 700 ppm within the polyethylene terephthalate resin. This loading permitted a comparable color loading measurement with a comparative plaque produced from PET with 500 ppm of Tinuvin® 234. Starting at a similar color loading, the two plaques were then measured for lightfastness (K/S) at the same wavelength (here 370 nm) at exposure times of 0, 10 hours, 20 hours, and 40 hours in the presence of a Xenon Arc lamp (to simulate sunlight). Good lightfastness is exhibited through similar K/S measurements over time. The results of this comparison are as follows:

TABLE 2

Lightfastness Measurements of PET Plaques

| Plaque | Exposure Time (Hours) | K/S Value |
| --- | --- | --- |
| A | 0 | 5.735 |
| A | 10 | 6.162 |
| A | 20 | 6.100 |
| A | 40 | 5.888 |
| Comparative | 0 | 6.080 |
| Comparative | 10 | 6.307 |
| Comparative | 20 | 6.250 |
| Comparative | 40 | 6.233 |

As these measurements indicate, the K/S values for each plaque over time are the same within statistical error. Thus, the inventive UV absorber performs comparably with the commercially available product.

Transmission Data for Polypropylene Resins

In order to compare the percent transmittance of UV light through two different polypropylene resin plaques in accordance with the following Table:

TABLE 3

Polypropylene Plaques Produced for Further % Transmittance Testing

| Plaque # | UV Absorber | Resin |
| --- | --- | --- |
| C (Comparative) | 80 ppm Tinuvin ® 326 plus 20 ppm of Cyasorb ® UV-531 | Polypropylene |
| D | 200 ppm of EXAMPLE 1, above, plus 20 ppm of Cyasorb ® UV-531 | Polypropylene |

These plaques were formulated to possess similar color values. The transmittance spectra of both plaques were measured from 290 nm to 425 nm in 5 nm increments. The results are as follows:

TABLE 4

% Transmission of UV Light Through Polypropylene Resin

| | Plaques Tested | |
| --- | --- | --- |
| Wavelength (nm) | C | D |
| 290 | 65.600 | 51.475 |
| 295 | 67.300 | 54.760 |
| 300 | 65.945 | 54.000 |
| 305 | 65.750 | 52.795 |
| 310 | 65.425 | 51.785 |
| 315 | 65.340 | 50.775 |
| 320 | 66.275 | 50.130 |
| 325 | 67.010 | 49.915 |
| 330 | 68.800 | 50.555 |
| 335 | 68.555 | 49.495 |
| 340 | 68.000 | 47.885 |
| 345 | 67.235 | 45.785 |
| 350 | 67.455 | 44.840 |
| 355 | 67.315 | 44.220 |
| 360 | 67.475 | 43.100 |
| 365 | 69.210 | 42.255 |
| 370 | 70.865 | 42.445 |
| 375 | 72.555 | 42.975 |
| 380 | 74.415 | 43.930 |
| 385 | 77.375 | 46.225 |
| 390 | 79.995 | 49.195 |
| 395 | 82.955 | 53.595 |
| 400 | 84.050 | 57.275 |
| 405 | 85.070 | 62.115 |
| 410 | 86.045 | 67.355 |
| 415 | 86.010 | 72.230 |
| 420 | 86.555 | 76.000 |
| 425 | 86.585 | 79.620 |

Since the lower % transmission represents better performance, it is evident that over the wide range of wavelengths, the inventive UV absorber, in conjunction with a small amount of commercially available UV absorber, provides greater overall protection for the target polypropylene resin.

Transmission Data for PET Resins

In order to compare the percent transmittance of UV light through four different PET resin plaques in accordance with the following Table:

TABLE 5

PET Plaques Produced for Further % Transmittance Testing

| Plaque # | UV Absorber | Resin |
| --- | --- | --- |
| E (Comparative) | 80 ppm Tinuvin ® 326 plus 20 ppm of Cyasorb ® UV-531 | Polyethylene Terephthalate |
| F | 200 ppm of EXAMPLE 1, above, plus 20 ppm of Cyasorb ® UV-531 | Polyethylene Terephthalate |
| G (Comparative) | 400 ppm Tinuvin ® 326 plus 100 ppm of Cyasorb ® UV-531 | Polyethylene Terephthalate |
| U | 1,000 ppm of EXAMPLE 1, above, plus 100 ppm of Cyasorb ® UV-531 | Polyethylene Terephthalate |

These plaques were formulated to possess similar color values. The transmittance spectra of both plaques were measured from 290 nm to 425 nm in 5 nm increments. The results are as follows:

TABLE 6

% Transmission of UV Light Through PET Resin

| | Plaques Tested | | | |
| --- | --- | --- | --- | --- |
| Wavelength (nm) | E | F | G | H |
| 290 | 0.300 | .0205 | 0.150 | 0.010 |
| 295 | 0.375 | 0.175 | 0.105 | 0.110 |
| 300 | 0.175 | 0.310 | 0.220 | 0.055 |
| 305 | 0.245 | 0.335 | 0.210 | 0.035 |
| 310 | 0.280 | 0.330 | 0.230 | 0.025 |
| 315 | 0.640 | 0.570 | 0.225 | 0.285 |
| 320 | 1.765 | 2.160 | 0.605 | 0.800 |
| 325 | 7.815 | 13.370 | 1.305 | 3.935 |
| 330 | 14.245 | 24.530 | 2.300 | 6.525 |
| 335 | 17.745 | 30.095 | 2.920 | 6.970 |
| 340 | 18.795 | 32.665 | 2.820 | 6.890 |
| 345 | 19.470 | 35.030 | 2.715 | 6.700 |
| 350 | 20.375 | 37.260 | 2.715 | 6.480 |
| 355 | 21.505 | 38.840 | 2.910 | 6.000 |
| 360 | 23.300 | 39.505 | 3.310 | 5.405 |
| 365 | 26.655 | 41.000 | 4.305 | 4.795 |
| 370 | 30.655 | 41.490 | 6.100 | 4.105 |
| 375 | 36.225 | 41.615 | 8.920 | 3.530 |
| 380 | 41.945 | 41.700 | 13.505 | 3.190 |
| 385 | 50.240 | 42.415 | 20.970 | 3.170 |
| 390 | 58.530 | 43.065 | 31.450 | 3.390 |
| 395 | 68.200 | 45.990 | 46.625 | 4.030 |
| 400 | 74.875 | 48.670 | 60.230 | 5.260 |
| 405 | 80.495 | 53.250 | 72.520 | 8.280 |
| 410 | 83.975 | 59.560 | 79.980 | 13.305 |
| 415 | 86.210 | 66.115 | 83.880 | 21.795 |
| 420 | 86.590 | 71.715 | 85.765 | 32.625 |
| 425 | 87.105 | 77.230 | 86.695 | 46.075 |

Since the lower % transmission represents better performance, it is evident that over the wide range of wavelengths, the inventive UV absorber, in conjunction with a small amount of commercially available UV absorber, provides greater overall protection for the target PET resin.

Screw Slippage Testing

The final test was a Screw Slippage Out-put analysis within an extrusion machine. The machine used was a Killion extruder with a 1 inch diameter screw and a 32:1 length:diameter ratio. The time to extrude 1000 g of resin was recorded. The out-put factor for each resin composition was measured as the ratio of time required to extrude 1000 g of treated samples in relation to the pure control sample. An out-put factor at or near 1.00 (either above or below) indicated very little screw slippage and thus a highly favorable result. The composition of the formulations used for Plaques A and B were tested versus a control resin of polyethylene terephthalate resin alone. These inventive compositions both exhibited excellent screw slippage rates of 1.01, nearly the same as for the resin itself.

Thermoset Composition Formation

The UV absorber was added to the following standard polyurethane foam precursor compositions, one including the UV absorber from Example 3, and one from Example 4 (a control with no UV absorber was also produced with the same formulation):

| COMPOSITION | |
| --- | --- |
| Component | Amount |
| Arcol ™ F3020 (Aroco) (polyol) | 100.00 g |
| water | 4.52 mL |
| Dabco ® 33 LV (Air Products) | 0.15 mL |
| L-520 silicon | 1.50 mL |
| T-10 catalyst | 0.32 mL |
| Toluenediisocyanate (Bayer) | 49.0 mL |
| UV Absorber | 0.50 g |

The compositions were then processed to form foams upon introduction of the water to generate carbon dioxide when reacted with the isocyanate. The resultant foams were each cured for three minutes at 160° C., allowed to cool, and then cut open. There was no measurable difference in bun height or in rise time between the resultant foams containing the inventive UV absorbers and the control foam product.

While specific features of the invention have been described, it will be understood, of course, that the invention is not limited to any particular configuration or practice since modification may well be made and other embodiments of the principals of the invention will no doubt occur to those skilled in the art to which the invention pertains. Therefore, it is contemplated by the appended claims to cover any such modifications that incorporate the features of the invention within the true meaning, spirit, and scope of such claims.

What is claimed is:

1. A methine-based ultraviolet absorber compound having a UV absorption maximum of from about 320 to about 400 nm, wherein said compound comprises at least one polyoxyalkylene chain.

2. The compound of claim 1 wherein
said polyoxyalkylene chain comprises at least two groups of oxyalkylene moieties selected from the group consisting of at least one $C_2$-$C_{10}$ alkylene oxide, glycidol, and any mixtures thereof.

3. The compound of claim 2 wherein
said oxyalkylene moieties are selected from the group consisting of ethylene oxide, propylene oxide, butylene oxide, glycidol, and any mixtures thereof.

4. The compound of claim 1 wherein
said methine-based ultraviolet absorber compound conforms to structure represented by Formula (I)

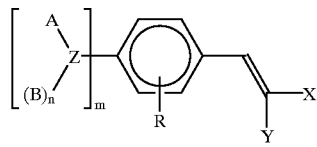

wherein R is selected from the group consisting of $C_{1-20}$ alkyl, halo, hydroxyl, hydrogen, cyano, sulfonyl, sulfo, sulfato, aryl, nitro, carboxyl, and $C_{1-20}$ alkoxy; X and Y are the same or different and are selected from the group consisting of C(O)OR, C(O)R, $C_{1-20}$alkyl, and $C_{1-20}$ alkoxy, and R is defined as above; Z is a linking group selected from the group consisting of N, O, and S; m is 1, 2, or 3; A is represented by the Formula (II)

$$[\text{Alkyleneoxy constituent}]_z R'  \qquad (II)$$

wherein Alkyleneoxy constituent is selected from the group consisting of $C_{2-20}$ alkyleneoxy, R' is selected from the group consisting of hydrogen, $C_{1-20}$ alkoxy, $C_{1-20}$ alkyl, and $C_{1-20}$ esters; B is selected from the group consisting of hydrogen, lower alkyl, and A; and n is either 0 or 1, wherein n is 1 if Z is N, and n is 0 if Z is either O or S.

5. A thermoplastic composition comprising at least one thermoplastic component and the compound of claim 1.

6. The thermoplastic composition of claim 5 wherein
said thermoplastic component is selected from the group consisting of a polyester, a polyolefin, a halogenated polymer, a polyamide, and any mixtures thereof.

7. The thermoplastic composition of claim 6 wherein
said thermoplastic is a polyester.

8. The thermoplastic composition of claim 7 wherein
said polyester is polyethylene terephthalate.

9. The thermoplastic composition of claim 6 wherein
said thermoplastic is a polyolefin.

10. The thermoplastic composition of claim 9 wherein
said polyolefin is selected from the group consisting of polyethylene, polypropylene, polybutylene, and any mixtures thereof.

11. The thermoplastic composition of claim 10 wherein
said polyolefin is polypropylene.

12. A thermoset composition comprising at least one thermoset component and the compound of claim 1.

13. The thermoset composition of claim 12 wherein said thermoset is a polyurethane.

* * * * *